Sept. 26, 1950     H. S. HENDRICKSON     2,523,299
ELECTRONIC CONTROL SYSTEM

Filed Feb. 15, 1945     2 Sheets-Sheet 1

INVENTOR
HAROLD S. HENDRICKSON
BY
Herbert N. Thompson
his ATTORNEY.

INVENTOR
HAROLD S. HENDRICKSON
BY
Herbert P. Thompson
ATTORNEY

Patented Sept. 26, 1950

2,523,299

UNITED STATES PATENT OFFICE 2,523,299

ELECTRONIC CONTROL SYSTEM

Harold S. Hendrickson, Hempstead, N. Y., assignor to The Sperry Corporation, a corporation of Delaware Application February 15, 1945, Serial No. 577,951

17 Claims. (Cl. 318—30)

My invention generally relates to an electronic control circuit adapted to control the operation of a servomotor in response to an error or control signal input thereto. My invention more particularly relates to a circuit which is so constructed and arranged as to produce two derivative signals or rate signals from a signal voltage input. In other words, if the signal voltage input to the circuit of my invention is a voltage having a magnitude which is a measure of displacement, the circuit of my invention is so designed that it will produce at least two time derivative signals or rate signals which are proportional to the rate of change of said input signal.

I have, in the accompanying drawings, illustrated my invention in connection with a servo follow-up system in which a driven object, such as a searchlight, is caused by means of a servomotor to be positioned in correspondence with a reference member which may be manually operated or positioned. In systems of this character, it is desirable to arrange the servo and its controls so that the object driven thereby will closely follow the reference member with very little lag and also with a minimum of oscillations. In recent developments in systems to which the present invention has particular application, such as those above referred to, so-called rate circuits are incorporated for the purpose of providing a system having a fast response with a minimum of oscillations. The rate signals which are produced in these systems ordinarily correspond to a first and a second derivative of the displacement signal with respect to time or, in other words, such signals are proportional to rate of displacement and acceleration.

Experience, however, has demonstrated that systems of the character above referred to tend to hunt or oscillate at two different frequencies. That is, if anti-hunting means are incorporated in the system to eliminate hunting and to reduce oscillations to a minimum at the first natural period of the system, it will tend to hunt or oscillate at a second frequency or natural period.

My invention essentially relates to a circuit for obtaining signal voltages proportional to time derivatives of a voltage such as one representing displacement, and particularly to such a circuit which is adapted separately to produce time derivatives at the two natural periods at which a servo mechanism controlled thereby may hunt or oscillate whereby a system having a fast response with no hunting and with a minimum of oscillation may be produced, and it is therefore the primary object of this invention to produce a circuit and system of the character last above described.

Another object of my invention is to provide a circuit in which two rate signals or derivative signals corresponding to rate of change of input signal may be produced, and in which the two rate signal producing means are separately adjustable to operate at a desired frequency or over a chosen frequency range.

It is another object of the present invention to provide a circuit for producing two rate or time derivative signals in which the circuit elements are connected with two of the electrodes of an electron tube whereby the rate signals will appear in the output of the tube along with the displacement signal.

More particularly, it is an object of this invention to provide a circuit of the foregoing character in which the circuit elements are associated with the cathode and grid of an electron tube, one group of circuit elements or circuit means functioning in conjunction with the cathode to produce a first rate or derivative signal which may be termed "cathode rate" and another group of circuit elements or means functioning in connection with the cathode and acting on the grid to produce another derivative signal, each of said signals being approximately proportional to rate of change of input signals which is initially impressed on the grid of the tube.

Still another object of the present invention resides in providing a control circuit or servo system which has a frequency response that rises linearly over a limited range for two bands of frequencies and the position of the bands can be changed and the change can be made independent of each other.

With the foregoing and other objects in view, my invention includes the novel circuit and the novel combinations and arrangements of elements described below and illustrated in the accompanying drawings, in which.

It will be understood that I have shown the rate signal-deriving circuit of the present invention embodied in a servo motor control for searchlights, mainly for exemplary purposes and also as an illustration of one use to which the present invention has been applied and for which it is particularly adapted.

Figure 1:
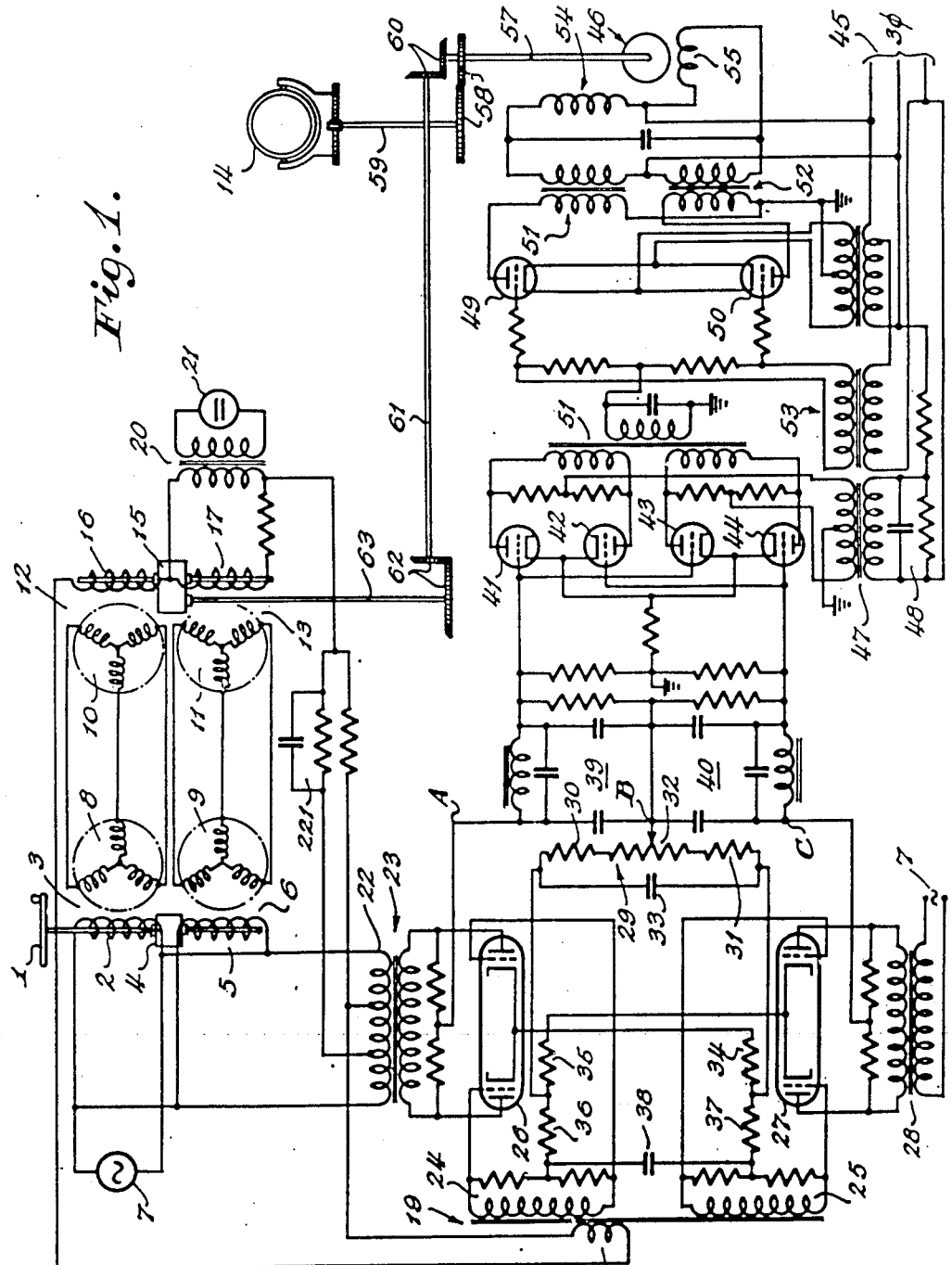
Fig. 1 is a wiring diagram of a servo motor and control system therefor for searchlights and illustrating one embodiment of the present invention.

Referring first to Fig. 1, I have shown a follow-up type system whereby a searchlight or other relatively heavy positionable object is driven by a motor in accordance with the manual positioning of a reference member. The reference member is indicated generally at 1 and may comprise a handwheel as shown which serves to drive the rotor 2 of a Selsyn or other similar type of transmitter 3. Handwheel 1 in the embodiment shown drives the rotor 2 in a 1:1 speed ratio with respect thereto and also through gear box 4 which houses a conventional speed multiplying gear train, drives the rotor 5 of a second transmitter 6 of the Selsyn type. Rotor 5 may be driven, for example, at a 36:1 speed ratio with respect to the handwheel, rotating 36 times for each revolution of the handwheel 1. The two transmitters 3 and 6 constitute respective coarse and fine signal transmitters in a signal transmission system, and both rotors are energized from a common source of alternating current 7 as shown. Each of the transmitters comprises a polycircuit stator winding as indicated generally at 8 and 9 which are respectively connected in polycircuit relation to corresponding windings 10 and 11 of receivers 12 and 13 of the Selsyn type.

The rotors of the signal receivers 12 and 13 are driven by suitable means, such as gears and shafting, as hereinafter described, in accordance with movements of the searchlight 14. A gear box 15 houses a gear transmission which is so arranged that the rotor of the coarse receiver 12 rotates in synchronism with the searchlight, while the rotor of the fine receivers 13 rotates at 36 times the speed of the searchlight or coarse receiver. Under these conditions, when the searchlight lies in agreement with the reference member, zero signal voltage will be produced in the windings 16 and 17 of the rotors of the receivers and under other conditions the amplitude of the voltage produced in the rotor winding 16 of the coarse receiver will be proportional to the error or displacement between the control or reference member and the driven object or searchlight, while the voltage produced in the winding 17 of the fine receiver will likewise be a measure of error but will vary in magnitude in a 36:1 ratio with respect to the actual error. The phase sense of the error signal will of course provide an indication of the direction in which the actual error occurred.

The voltages produced in the coarse and fine receivers which are hereinafter referred to as coarse and fine error signal voltages are added together and supplied to the primary 18 of a signal input transformer 19. However, the primary of a transformer 20 is connected across the rotor winding 17 of the fine receiver and the secondary thereof is connected to a neon lamp 21 which operates as a voltage limiting device to limit the amplitude of the fine error signal which is supplied to the input transformer 19.

In the system herein illustrated and described, I have purely for exemplary purposes indicated that the fine Selsyns are driven in a 36:1 ratio with respect to the coarse Selsyns. Where an even number ratio is adopted, it is possible that the system may become synchronized, that is, the input error voltage may be reduced to zero when the driven object and reference member are 180° displaced. Therefore, a voltage is derived, for example, from the primary 22 of transformer 23, phase shifted by network 221 and impressed across the primary 18 of the input transformer. This small voltage which is so derived functions relatively to displace the zero voltage positions of the coarse and fine Selsyns by a small amount such, for example, as 2½° when the driven object and the reference member are 180° displaced. Otherwise, the coarse and fine error voltages will reduce to zero together as the driven object and the reference member approach and finally lie in correponding positions. It is, of course, to be understood that under normal operating conditions the coarse error voltage is the principal component of signal employed in controlling the servo for comparatively large errors, say, in excess of 20' (twenty minutes while the fine error voltage signal is the principal control component for smaller errors.

As above described, the error voltages are supplied to the primary 18 of an input transformer 19 which has two secondaries 24 and 25 which are connected with the grids of two twin triodes comprised in a signal demodulator stage or full-wave rectifier. For illustration purposes and also because the rate-taking circuits of the present invention function vary well in this stage to provide an amplifier having a desired output, we have shown them as incorporated in the demodulator section of the servo amplifier.

The secondary 24 of input transformer 19 has its two ends connected to the respective grids of a twin triode 26 while the ends of the secondary 25 are connected respectively to the grids of a twin triode 27. The secondary of transformer 23, hereinabove described, is connected to supply plate potentials to the plates of tube 26 in phase opposition. Similarly, transformer 28 which is preferably connected with the source of alternating current 7 is connected to supply plate potentials to the plates of tube 27, which potentials are likewise in phase opposition. These tubes function as a full-wave, phase-sensitive demodulator or rectifier to provide D. C. voltages between the points A—B and B—C, which in magnitude and polarity are dependent upon the amplitude and phase sense of the signal voltage or voltages applied to the grids of the tubes. Under quiescent conditions or periods of zero signal voltage, the D. C. voltages across A—B and B—C are equal and opposite. However, an increase in signal voltage will cause one or the other thereof to predominate and the one so predominating will depend upon the phase sense of the displacement error signal or the direction in which the error occurs.

The first of the rate-taking circuits of the present invention is indicated generally at 29 and comprises resistors 30 and 31 connected in series with balancing potentiometer 32 and a capacitance or condenser 33 which is connected across these series resistors. The cathode of tube 26 is connected through resistor 34 and to the resistor-condenser network 29 at one side thereof, while the other side of the network is connected through resistor 35 to the cathode of tube 27. The series resistors connected in circuit with the cathodes of the tubes are of sufficiently high resistance value as to cause degeneration, while the condenser 33 has such a capacity value that it will materially delay the degeneration of the tube. For example, the resistance in circuit with the cathodes of these tubes may be of the order of 10,000 to 20,000 ohms, or preferably of the order of magnitude of the impedance in the plate circuit of the tube, and the condenser may be of, for example, one microfarad capacity. A more detailed description of a cathode connected resistance-capacitance network which functions to produce components proportional to rate of change of an input signal in the output of the tube may be found in the copending application of R. D. McCoy, Serial No. 495,297, now matured into Patent No. 2,464,249, issued March 15, 1949, which is assigned to the assignee of the present invention.

The second resistance-capacitance network for deriving a signal approximately proportional to rate of change of the input signal comprises the resistors 36 and 37 which are connected in circuit between the cathode of one of the tubes 26, 27 and the grids of the other tube. For example, resistor 37 is connected between the cathode of tube 27 and the grids of tube 26, and resistor 37 is connected between the cathode of tube 26 and the grids of tube 27. A condenser 38 is connected between the resistors 36 and 37 and preferably to the common points of connection between said resistors and the resistors across the secondaries of the input transformer 19.

The last-described circuit operates in the following manner. This circuit functions to connect the grids of one tube with the cathode of the other tube through a suitable resistance such that the change in potential of the cathode will tend to produce a change in an opposite polarity sense in the bias on the grids of the opposite tubes. The condenser 38 functions to control the change in bias on the grids by delaying the same. Thus, degeneration in one tube caused by a changing amplitude of signal voltage input to one tube produces a proportional but opposite effect or a more negative bias on the grids of the other tube which, being displaced, will give rise to a component in the output thereof which is approximately proportional to rate of change of the input voltage.

It is to be understood that the rate components produced by the network 29 may be adjusted to operate over a frequency range which is different from that over which the second rate-taking circuit is designed or adjusted to operate. Thus, one of the rate-taking networks, such as network 29, for example, may be adjusted so that the range of frequencies over which it is designed to operate will include that at which the servo system will first tend to oscillate or hunt when the error is reduced to zero, while the other network may be adjusted so that its range of frequencies will include the second frequency at which the system may tend to oscillate due to damping at the first oscillating frequency.

Furthermore, it will be observed that the rate-taking circuits of the present invention cooperate one with the other and with various of the electrodes of an electronic tube or tubes to produce the rate components together with a displacement component in the output or plate circuit of the tube. Hence, it is to be understood that I do not in any way wish to restrict the present invention to its use in a demodulator or any particular type of control system. But, the system herein described illustrates a preferred arrangement of circuit and one in which a full-wave effect, such as full wave demodulation, is derived.

The output of the demodulator stage, above described, is passed through filter networks, indicated generally at 39 and 40, comprising chokes and condensers, and the D. C. voltages are then applied to the grids of the tubes of a full-wave modulator stage.

It is, of course, not necessary under all conditions to pass the signal voltage through, first, a demodulator stage and then a modulator stage in order to effect control over a servomotor, but the system herein shown is arranged in this manner so that it may be used under conditions where the source of alternating current employed for signal voltage generating purposes is different in frequency from the source of alternating current at the servomotor or at that end of the system where the signal voltage should be of a frequency different from the original signal voltage. In a system of the foregoing character where a demodulator and modulator stage is employed, it is preferable to embody the rate circuits in the demodulator stage because in that stage they cannot distort the wave form of the signal applied to the grids of the Thyratrons which serve to control the flow of current in one phase of the servomotor.

As above indicated and as shown in Fig. 1, the D. C. voltages are applied to the grids of tubes 41, 42, 43 and 44 of a full-wave modulator, the plates of these tubes being operated with A. C. from one of the phases of a three-phase supply indicated generally at 45 which is employed in driving a servo motor indicated generally at 46. The plate supply may be derived through transformer 47 and a phase-shifting network 48 may be incorporated, as shown, for controlling the phase relation of the modulation signal derived in the output of the modulator stage and supplied to the grids of preferably Thyratrons 49 and 50.

Coupling between these latter two described stages is accomplished through transformer 51 and the output of the secondary of this transformer is impressed as an A. C., preferably phase-controlled, voltage on the grids of the tubes 49 and 50 in the same phase relationship. Plates of tubes 49 and 50 are operated preferably in out-of-phase relationship through the transformers 51 and 52, one winding of each of which is connected in circuit with one of the field windings of the motor 46 and across one phase of the three-phase source of supply. A bias voltage may be derived from the supply source through transformer 53 for controlling the firing of the tubes when no signal voltage is present. Energization of the windings 54 and 55 of the servo motor is controll' l by the tubes 49 and 50 which in turn are controlled by the signal voltages, the tubes when firing functioning, in effect, to shunt that one of the windings of the transformer 51 or 52 which is connected in the plate circuit thereof. Hence, the signal voltage controls the phase relation of the currents in windings 54 and 55 thus dictating the direction of rotation of the motor which is in accordance with the phase of the signal, and the rate of rotation of the motor is dependent upon the amplitude of the signal.

The servo motor 46 drives searchlight 14 through shaft 57, gears 58 and shaft 59 and also drives the coarse and fine Selsyn receivers through bevel gears 60, shaft 61, bevel gears 62 and shaft 63 which is connected with the gears in the gear box 15. The illustrated connections between the servo motor and the Selsyn receivers and searchlight are, of course, of a generally schematic nature and purely for purposes of illustration.

Figure 2:
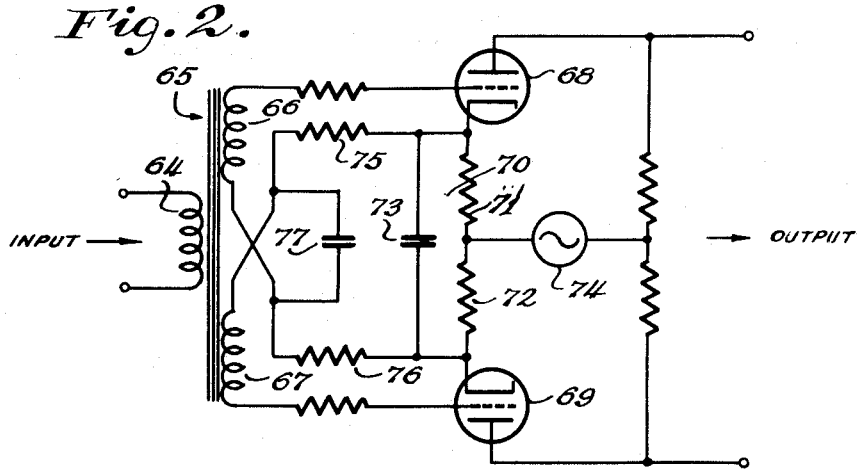
Fig. 2 is a wiring diagram of a circuit embodying my invention and which constitutes a half-wave, phase-sensitive circuit or amplifier.

In Fig. 2 I have shown a modified circuit of the present invention which forms a half-wave stage as compared to the full-wave demodulator in Fig. 1. The function of the rate signal-deriving circuits of Fig. 2, is substantially the same as that described in connection with Fig. 1. The input signal is applied across the primary 64 of input transformer 65 having two secondary windings 66 and 67. One end of secondary 66 is connected with the grid of one tube 68 of a pair of tubes 68 and 69, and one end of secondary 67 is similarly connected to the grid of the other tube 69. A rate-taking circuit indicated generally at 70 and which is generally similar to the rate-taking circuit 29 of Fig. 1 is incorporated in the cathode circuit of both tubes. This circuit comprises the resistors 72 and 71 and the capacitance or condenser 73. The resistance value of these resistors and the capacitance of the condenser is, as hereinbefore described, of such size order that the resistance will produce degeneration of the tube while the capacitance will delay degeneration so as to provide a component in the output circuit of the tube which is approximately proportional to the rate of change of input signal supplied to the grid of the tube. A source of alternating current such as that included at 74 may be connected between the cathodes and plates of the two tubes as illustrated, so that the circuit may function, for example, as a phase-sensitive, half-wave rectifier, half-wave demodulator, or half-wave modulator.

The second rate signal voltage component is obtained in a manner similar to that described in connection with Fig. 1 by connecting the cathode of tube 68 through resistor 75 to one end of the secondary 67 of the input transformer and by connecting the cathode of tube 69 through resistor 76 to one end of the secondary 66 of the input transformer. A condenser 77 is connected between the resistor 75 and 76 and between points connecting these resistors with the secondaries of the input transformer. With the above described connections it will be observed that the cathode of one tube will serve to bias the grid of the other tube in an opposite polarity sense when a voltage drop across the cathode resistors 71 or 72 occurs due to a change in signal voltage applied to the grids of the tubes. Hence, the grid of each tube has a signal voltage impressed thereon and also a bias depending upon the operation of the opposite tube or a change in its cathode potential due to a changing signal voltage. Since condenser 77 serves to delay the application of the biasing voltage on the grids of the tubes which biases them in a negative direction, the output of the tubes will contain a component of voltage which is dependent upon the rate of change of the signal output. In the embodiment shown in Fig. 2, it will be observed that tubes 68 and 69 will provide only half-wave operation as compared to the full-wave operation obtained from the circuit of Fig. 1.

Figure 3:
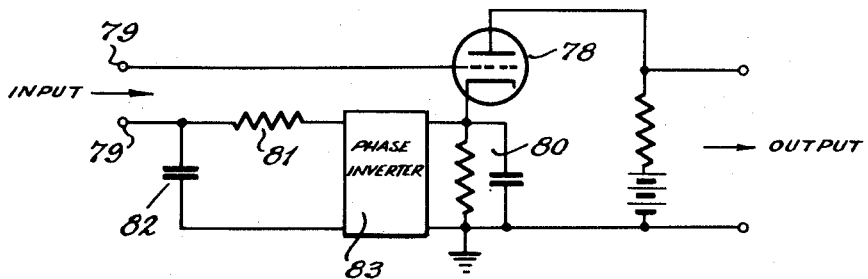
Fig. 3 is a wiring diagram of a modified form of circuit embodying my invention in which but one tube is employed.

In Fig. 3 I have shown a circuit embodying the present invention which is herein shown and described mainly for the purpose of completing a clear and readily understandable description of the theory and operation of the circuits of the present invention. In this embodiment of my invention, one tube is employed as indicated at 78. The signal voltage is impressed on the grid thereof or across the terminals 79. The rate-taking circuit 80 is connected in the cathode circuit of the tube and operates in the same manner as the rate-taking circuits 29 and 70 hereinbefore described. The second rate-taking circuit comprises the resistor 81 and condenser 82 and this second resistance-capacitance network functions in substantially the same manner as those hereinabove described for supplying a bias to the grid of tube 78. However, a phase inverter, indicated generally at 83, is connected between the two rate-taking circuits for the purpose of providing a 180° reversal of phase or a reversal of polarity of the voltage supplied to the second rate-taking circuit or the resistance-capacitance network 81, 82. In the circuits of my invention illustrated in Figs. 1 and 2, the phase reversal or reversed polarity potential is obtained by supplying the grid bias of one tube from the cathode of the other tube, the tubes being connected in push-pull fashion.

Figure 4:
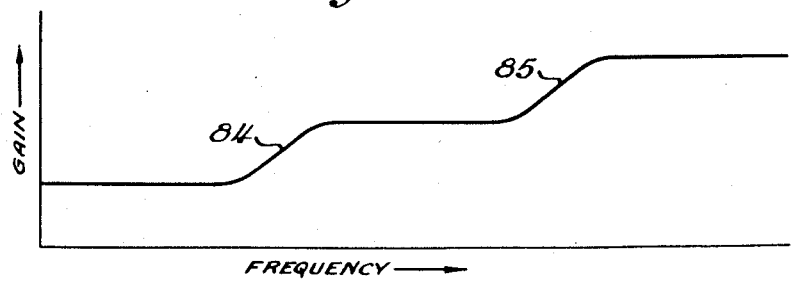
Fig. 4 illustrates the general nature of the performance curve of the gain of a system embodying the rate circuits of the present invention.

The curve of Fig. 4 represents generally the gain of the amplifier of the present invention or of the servo system, plotted against frequency. It will be noted that a change in gain occurs in the zones 84 and 85, which zones correspond respectively to the frequency ranges at which the respective rate-taking circuits operate. In other words, if the servo tends to hunt or oscillate at a frequency corresponding to the zone 84 of the curve, the increasing gain of the system or amplifier at that frequency will provide damping, and if, as a result of this damping, the system tends to oscillate at a second frequency corresponding to the portion of the curve designated 85, the second rate-taking circuit providing this increasing gain over the chosen frequency range will again provide damping at the second oscillation frequency. Hence, the two rate-taking circuits may be independently adjusted to provide damping at the frequencies corresponding to the portions of the curve designated 84 and 85, respectively, which are the assumed frequencies or natural periods of oscillation of the servo at substantially zero error.

While I have described my invention in its preferred embodiments it is to be understood that the words which I have used are words of description rather than of limitation and that changes within the purview of the appended claims may be made without departing from the true scope and spirit of my invention in its broader aspects.

What is claimed is:

1. In a control circuit of the character described, a pair of electron tubes each having plate, cathode and grid elements, means for supplying a signal voltage input in controlling relation and in opposite phase sense to said tubes, means connected in the cathode circuits of said tubes for providing a component of voltage in the tube outputs proportional to rate of change of signal voltage supplied to said tubes, and means respectively connecting the cathode of one tube with the grid of the other tube for providing a component of voltage in the tube outputs proportional to rate of change of signal voltage supplied to the tubes.

2. In a control circuit of the character described, a pair of electron tubes each having plate, cathode and grid elements, means for supplying a signal voltage input in controlling relation to said tubes, a resistance-capacitance network connected between the cathodes of said tubes whereby to supply a voltage component in the tube outputs proportional to rate of change of signal voltage input, and resistance-capacitance networks connecting said first-mentioned network with the grids of said tubes whereby to supply a voltage component in the outputs of said tubes proportional to rate of change of signal voltage input, said networks being designed to function at different frequencies.

3. In a control circuit of the character described, a pair of electron tubes each having plate, cathode and grid elements, means for supplying a signal voltage in controlling relation and in opposite phase sense, respectively, to the grids of said tubes, coupling means having impedance connected with the plates of said tubes, network means comprising an impedance of the order of magnitude of the impedance of said coupling means and capacitance connected in the cathode circuits of said tubes, said impedance-capacitance network functioning to supply a voltage component in the output of said tubes proportional to rate of change of signal input, means comprising impedance-capacitance networks connecting the cathode of each tube with the grid of the other tube and adapted to provide a voltage component in the outputs of said tubes proportional to rate of change of the signal voltage input, and a motor coupled to the output of said circuit and controlled thereby, said impedance-capacitance networks serving to supply said voltage components for different frequencies of signal voltage change.

4. In a control circuit of the character described, means for supplying a signal voltage, a pair of electron tubes connected in push-pull fashion and each having plate, cathode and grid elements, means for applying a signal from said signal supplying means to the grids of said tubes in opposite phase sense, network means comprising resistance and capacitance connected in parallel in the cathode circuit of each tube, said resistances being of a magnitude sufficient to provide degeneration for the tubes and the capacitance value being sufficient to delay the degeneration whereby to provide tube outputs having components proportional to rate of change of signal voltage input, and resistance-capacitance networks interconnecting the grid of one tube and the cathode of the other tube for supplying components in the tube outputs proportional to rate of change of signal voltage input; said first and second mentioned networks being so constructed and arranged as to supply voltage components in the tube outputs proportional to rate of change of signal voltage input respectively at different frequencies of signal change.

5. In a servomotor system of the character described including a motor, a control signal source, a control circuit having its output connected to control said motor and repeat-back means from the output of said motor to said signal source, a control circuit comprising an electron tube, means for supplying a signal voltage input in controlling relation to said tube, means for effecting an increased gain of the circuit at the frequency of change of signal input corresponding to that at which said system may first tend to oscillate at a natural period, and means for effecting an increasing gain of the circuit over a second band of frequency of change of signal input corresponding to the second frequency at which said system may tend to oscillate due to damping at its first natural oscillating frequency.

6. In a servomotor system of the character described including a motor, a control signal source, a control circuit having its output connected to control said motor and repeat-back means from the output of said motor to said signal source, a control circuit comprising an electron tube, means for supplying a signal voltage input in controlling relation to said tube, means for effecting an increased gain of the tube at the frequency of change of signal input corresponding to that at which said system may first tend to oscillate at a natural period, and means for effecting an increased gain of the tube at the frequency of change signal input corresponding to the second frequency at which said system may tend to oscillate due to damping at its first natural oscillating frequency.

7. In a servomotor system of the character described including a motor, a control signal source, a control circuit having its output connected to control said motor and repeat-back means from the output of said motor to said signal source, a control circuit comprising an electron tube having plate, cathode and control electrode elements, means for supplying a signal voltage input in controlling relation to said tube, means connected with the cathode of said tube for providing degeneration for said tube, means for delaying degeneration when a change in signal voltage input to said tube occurs whereby to provide a component of voltage in the tube output proportional to rate of change of input signal at one frequency of change in input signal, and means connected in the control electrode circuit of said tube for providing a component of voltage in the tube output proportional to rate of change of input signal at a second and different frequency of change in input signal.

8. In a servomotor system of the character described including a motor, a control signal source, a control circuit having its output connected to control said motor and repeat-back means from the output of said motor to said signal source, a control circuit comprising an electron tube having plate, cathode and grid elements, means for supplying a signal voltage input in controlling relation to said tube, a first means connected in the cathode circuit of said tube for providing a component of voltage in the tube output proportional to rate of change of input signal, and a second means connected in the grid circuit of said tube for providing a component of voltage in the tube output proportional to rate of change of input signal.

9. In a servomotor system of the character described including a motor, a control signal source, a control circuit having its output connected to control said motor and repeat-back means from the output of said motor to said signal source, a control circuit comprising an electron tube having plate, cathode and grid elements, means connected with the cathode of said tube comprising resistance of sufficient magnitude as to provide degeneration for said tube and capacitance for delaying degeneration when a change in signal voltage input to said tube occurs whereby to provide a component of voltage in the tube output proportional to rate of change of input signal, and means connected in the grid circuit of said tube comprising resistance and capacitance for providing a component of voltage in the tube output proportional to rate of change of signal input for a different frequency range than that over which said first mentioned resistance and capacitance functions to supply said component proportional to rate.

10. In a control circuit of the character described, a pair of electron tubes connected in push-pull fashion with an output and each having plate, cathode and control electrode elements, means for supplying a signal voltage input in controlling relation to the control electrodes of said tubes, means connected in the cathode circuit of one tube for providing a component of voltage across said output proportional to rate of change of said signal voltage, and means connecting the cathode circuit of said one tube with the control electrode of the other tube for providing a component of voltage across said output proportional to the rate of change of signal voltage supplied to the tubes.

11. A control circuit of the character described in claim 10 in which the rate component-providing means in the cathode circuit comprises an impedance-reactance network.

12. A circuit of the character recited in claim 10 in which both of the rate component-providing means comprise impedance-reactance networks.

13. In a control circuit of the character described, a pair of electron tubes connected with an output and each having plate, cathode and control electrode elements, means for supplying a signal voltage input to the control electrodes of said tubes, an impedance-reactance network connected in the cathode circuits of said tubes for providing a component of voltage across said output proportional to rate of change of signal voltage supplied to said tubes, and a second impedance-reactance network connecting the first mentioned network with the control electrodes of said tubes for providing a component of voltage across said output proportional to rate of change of signal voltage.

14. In a control circuit of the character described, a pair of electron tubes connected in push-pull fashion with an output and each having plate, cathode and control electrode elements, means for supplying a signal voltage input to the control electrodes of said tubes, an impedance-reactance network connected in the cathode circuit of one tube for providing a component of voltage in said output proportional to rate of change of said signal voltage, and a second impedance-reactance network connecting the first mentioned network with the control electrode of the other of said tubes for providing a component of voltage in said output proportional to rate of change of signal voltage supplied to the tubes.

15. A control circuit of the character recited in claim 14 in which said networks are designed to function at different frequencies of change of signal input.

16. In a control circuit of the character described, electron tube means having plate, cathode and control electrode elements, means for supplying a signal voltage to a control electrode of said tube means, means connected with a cathode of said tube means for providing tube degeneration, means for delaying said degeneration when a change in signal voltage input to said tube means occurs whereby to provide a component of voltage in the output of said tube means proportional to rate of change of input signal, means for supplying the voltage across said degeneration-providing means to a control electrode of said tube means, and means for delaying the application of said last mentioned voltage to said electrode whereby to provide a component of voltage in the output of said tube means proportional to rate of change of input signal.

17. A circuit of the character recited in claim 16 in which the means providing a delayed application to the control electrode of the voltage across the degeneration-providing means comprises an impedance-reactance network.

HAROLD S. HENDRICKSON.

REFERENCES CITED

The following references are of record in the file of this patent:

UNITED STATES PATENTS

| Number | Name | Date |
| --- | --- | --- |
| 1,851,905 | Hayes | Mar. 29, 1932 |
| 2,264,715 | Rohr et al. | Dec. 2, 1941 |
| 2,315,040 | Bode | Mar. 30, 1943 |
| 2,333,393 | Ryder | Nov. 2, 1943 |

OTHER REFERENCES

"A Continuous-Control Servo System," by Joseph T. McNaney, "Electronics," December 1944, pp. 118–125.

Certificate of Correction

Patent No. 2,523,299 September 26, 1950

HAROLD S. HENDRICKSON

It is hereby certified that error appears in the printed specification of the above numbered patent requiring correction as follows:

Column 4, line 32, for "vary" read *very*; column 7, line 29, for the word "included" read *indicated*; line 61, for "output" read *input*; column 9, lines 65 and 66, strike out "over a second band of" and insert instead *at the*; column 10, line 8, after "change" insert *of*;

and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*